(12) United States Patent
Corrigan et al.

(10) Patent No.: US 10,091,052 B1
(45) Date of Patent: Oct. 2, 2018

(54) ASSESSMENT OF NETWORK FAULT ORIGIN

(71) Applicant: Amazon Technologies, Inc., Seattle, WA (US)

(72) Inventors: John Corrigan, Dublin (IE); Conor Patrick McElhinney, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 49 days.

(21) Appl. No.: 14/749,476

(22) Filed: Jun. 24, 2015

(51) Int. Cl.
*H04L 12/24* (2006.01)
*G06F 11/07* (2006.01)

(52) U.S. Cl.
CPC ...... *H04L 41/0631* (2013.01); *G06F 11/0709* (2013.01); *G06F 11/079* (2013.01)

(58) Field of Classification Search
CPC .. G06F 11/008; G06F 11/0709; G06F 11/079; G06F 11/3466; G06F 11/3476; G06F 11/3495; H04L 41/06; H04L 41/0631; H04L 41/142
USPC .............................................. 714/37, 43, 45
See application file for complete search history.

(56) References Cited

U.S. PATENT DOCUMENTS

| | | | |
|---|---|---|---|
| 7,346,679 B2* | 3/2008 | Padmanabhan ..... | H04L 12/2854 370/236.1 |
| 8,661,295 B1 | 2/2014 | Khanna et al. | |
| 9,369,360 B1* | 6/2016 | Segalov ................. | H04L 41/046 |
| 2013/0148513 A1* | 6/2013 | Szabo ................... | H04L 41/142 370/252 |

OTHER PUBLICATIONS

U.S. Appl. No. 13/764,719, filed Feb. 11, 2013, Rauser et al.

* cited by examiner

*Primary Examiner* — Joseph R Kudirka
(74) *Attorney, Agent, or Firm* — Baker & Hostetler LLP

(57) ABSTRACT

A network endpoint may issue network traces directed to another endpoint. Completed traces may provide information pertaining to possible paths between the endpoints. In response to a failed trace, a component along a possible path between the endpoints may be associated with a value that indicates an assessed contribution of the component to the network failure. The value may be used to initialize a parameter to a statistical calculation that iteratively refines the estimate to form a probability estimate regarding a likelihood that the component is contributing to a network fault.

20 Claims, 10 Drawing Sheets

| | successes column 400 | faults column 402 |
|---|---|---|
| component 404 | 100 | 0 |
| component 406 | 100 | 10 |
| component 408 | 100 | 10 |
| component 410 | 100 | 10 | attribution record 424

|  | successes column 400 | faults column 402 |
|---|---|---|
| component 404 | 100 | 0 |
| component 406 | 100 | 10 |
| component 408 | 100 | 10 |
| component 410 | 100 | 10 | attribution record 424

FIG. 4

| | successes column 500 | faults column 502 |
|---|---|---|
| component 504 | 100 | 0 |
| component 506 | 100 | 5 |
| component 508 | 100 | 20 |
| component 510 | 100 | 5 | attribution record 524

ASSESSMENT OF NETWORK FAULT ORIGIN

BACKGROUND

Large computer networks may contain hundreds or thousands of components of various types, such as switches, routers, and hubs. Due to various factors such as the complexity of the components and their numbers, it is likely that, at some point, a network component will encounter a fault or otherwise cause problems that degrade the operation of the network. Management of large computer networks may therefore involve identifying network failures when they occur and locating the network component or components that contributed to or were otherwise responsible for the error. However, detecting and, in particular, locating failed network components remains a challenging endeavor.

Some approaches to locating network components that are involved in faults may involve using various statistical techniques. These may include techniques, such as expectation maximization or stochastic gradient descent, which may be used to form estimates of parameters to a statistical model. The parameters, as applied to locating faulty network components, may comprise the likelihood that a particular network component has been or is involved in a network fault.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

FIG. 4 is a block diagram depicting an example of a record in which attributions of successful and unsuccessful network traces may be stored.

DETAILED DESCRIPTION

Figure 1:
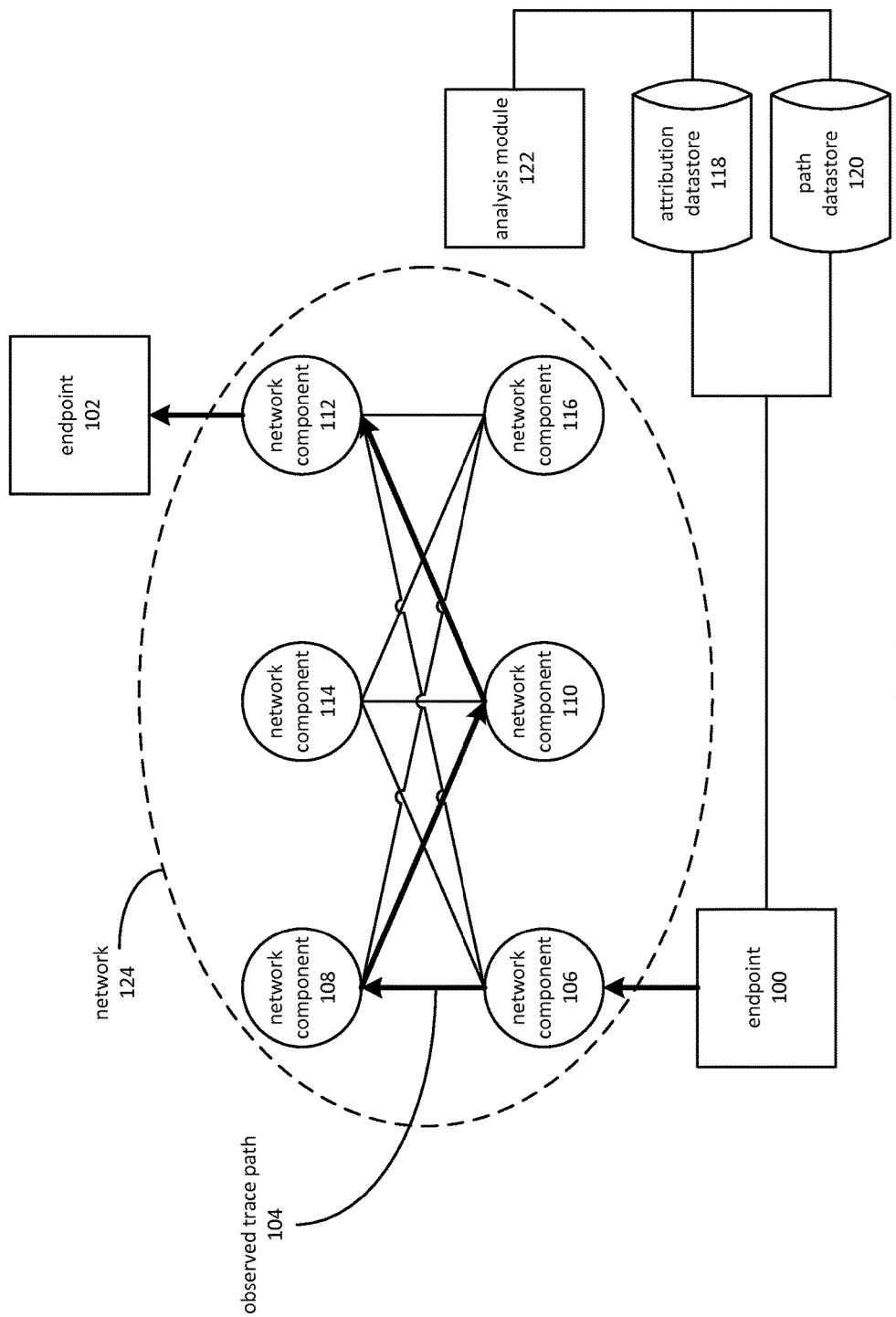
FIG. 1 is a block diagram depicting a system estimating a network fault location using an initial attribution of contribution to the fault.

The cause of a network fault may be several steps removed from the location where the fault was observed. For example, a packet transmitted from one computing device to another might pass through a number of other components, such as network switches, hubs, and routers. Each of these components may, in turn, receive and forward the packet as it travels along a path from its source to its destination. A bottleneck or other problem in a component towards the end of the path might cause components earlier in the path to fail.

Network traces, sometimes referred to as probes, may be used to diagnose network faults and to collect information that may be used to estimate a location of network components believed to be contributing to the faults. A network trace may involve transmission of a succession of packets along a path between two endpoints of a network. By examining successful and unsuccessful transmissions of packets over a period of time, a component or components that might be contributing to network faults may be identified. A successful transmission may be those that reach their intended destination within some period of time, while an unsuccessful transmission may be one which either does not reach its intended destination, or does not reach its intended destination within some period of time. A fault may refer to an event or condition, which may either be completed or ongoing, which is related to a network problem, including unsuccessful or delayed transmissions.

A trace between two endpoints may be described as succeeding if one or more of the packets reach the endpoint at the end of the path. The trace may be said to fail if the endpoint is not reached by any of the packets. This may occur when a component towards the end of the path is faulty in some way. However, a typical network trace may indicate that a component earlier in the path failed, without indicating the true source of the failure. The network trace may, however, provide additional information that may be used to estimate the location of a component that may be contributing to a fault. This information may include a path taken between two endpoints and a terminal point of a failed network trace. This information may be used to make an initial assessment of responsibility for causing a fault that may then be refined through a statistical calculation.

In some instances, a trace may involve diagnostic operations involving one or more components along a path between the endpoints. For example, a trace may involve point-to-point transmissions between two components on a path between the endpoints, or various other forms of active monitoring.

The location of a faulty component within a network of components may be estimated using a statistical calculation such as expectation maximization or stochastic gradient descent. The calculation may, for example, involve calculating values that correspond to the likelihood that various network components have encountered a fault or are otherwise interfering with operation of the network. For a given component, a value might correspond to a count of the number of failures estimated to be caused by the component. The values may be estimated through an iterative process of evaluation and refinement. The statistical model could be initialized to a uniform state, in which each component is considered to be equally at fault, that is then refined through iteration. However, the accuracy of this approach may be limited by issues such as local minima and local maxima. The use of the initial assessment techniques described herein may reduce these issues in some instances.

Various tools and techniques may be used for monitoring network behavior. These tools and techniques may involve network traces that transmit packets between two endpoints on the network. An endpoint may include a network component or other device connected to a network, and can include various computing devices as well as specialized network hardware. Note that an endpoint is not necessarily at a terminal point of a network. Rather, an endpoint may include components at a beginning or an end of a communication made over a network. An endpoint may be configured to periodically initiate network traces in order to perform a diagnostic function. In some instances, the diagnostic features of a network component may be combined with other operations not solely intended to be diagnostic, such as monitoring regular packet transmission.

A failure of a packet to reach the endpoint may be treated as a fault and used as a limiting factor in refinement of the statistical model. This may involve iteratively evaluating the probability distribution produced by the statistical model so that the probability distribution conforms to the observed faults. However, additional information may be obtained from the network trace and used to form the initial state of the statistical model. Embodiments may, for example, obtain information that describes various hops along the path between the two endpoints, and information that indicates when there is a failed attempt to transmit a packet to a component.

The information about successful and unsuccessful packet transmissions may be monitored by an analysis module. For successful packet transmissions, the analysis module may maintain information about the paths taken by the packets as they traversed between endpoints. When a transmission fails, the analysis module may use the path information to attribute a portion of responsibility for the fault to the network components that are along a previously observed path, one that the failed transmission is presumed to have at least partially followed. A numeric value may be based on the attribution and associated with a component. The value may indicate the degree to which the component is assessed to have (or in other words is estimated to have) contributed to the fault. A count indicative of the failed packets may be distributed, via a weighting function, among components on the presumed path that are subsequent to the point where the transmission of the packet failed. The weighting function may be based in part on the distance from that point.

The numeric values attributed to a component based on the failure of an individual trace may be summed and normalized with respect to other faults. For example, if the components of a network were attributed 100 faults in total, a particular component associated with 30 of those might be associated with a normalized value of 0.3. This value may form part of an initial assessment of faults attributed to the component that can then be refined through application of a statistical model, such as expectation maximization.

FIG. 1 is a block diagram depicting a system estimating a network fault location using an initial attribution of responsibility for the fault. The system may comprise or be connected to a network 124, over which a first endpoint 100 issues periodic network traces in an attempt to determine if a second endpoint 102 is reachable. Failures observed during the trace may be indicative of a fault occurring within one of the network components 106-116 of the network 124. Similarly, a successful trace may indicate that certain of network components 106-116 are functioning as intended.

The first endpoint 100 may initiate a network trace by transmitting a message across a network 124 for delivery to the second endpoint 102. The network 124 may comprise a number and variety of network components 106-116. A network component can include devices such as routers, switches, hubs, transport mechanisms, and so forth. A message transmitted over network 124 may, therefore, be received, processed, and re-transmitted from various components within network 124 until the message reaches its destination. Various paths may be taken. For example, one possible path from endpoint 100 to endpoint 102 might include network component 106, followed by network components 108, 110, and 112, in that order. Various other paths might also be used, such as network component 106 followed by network components 110, 116, and 112, in that order.

A network trace may return information indicative of the path it took to reach its intended destination. For example, a network trace initiated by the first endpoint 100 might follow observed trace path 104. The first endpoint might receive information describing the network components 106, 108, 110, and 112 used in each hop. Note that the information may be incomplete, in that some components (such as various interconnects) might not be observable by the network trace.

Information describing the observed trace path 104 may be stored in a path datastore 120. A datastore may include any of various mechanisms for storing and retrieving data, such as relational and non-relational database management systems, file stores, file systems, and so forth. Embodiments may retrieve the path information from path datastore 120 and use it, in the event of a failed trace, to estimate the path that would have been taken had the failed trace succeeded. The path datastore 120 may also contain path information obtained through various means other than or in addition to observations made during trace operations. For example, the path datastore 120 might contain network topology information that is based on the physical configuration of the network.

Information regarding successful traces may be stored in attribution datastore 118. In a successful trace, each component may be attributed a portion of responsibility for the success. For example, for a successful trace along the observed trace path 104, each of network components 106, 108, 110, and 112 might be attributed some measure of the success. A record of this attribution may be stored in attribution datastore 118. In some instances, the record may correspond to attributing to each of network components 106, 108, 110, and 112 credit for the successful trace. The value of the record may, in some cases, be indicative of full credit, to each component, of the successful trace.

Information regarding a failed trace may also be stored in attribution datastore 118. In various embodiments, the data in the attribution datastore 118 may comprise mappings between components of network 124 and counts of faults attributed to each component. For example, in the event of a failed trace, an embodiment might attribute at least a portion of the fault to network components along the path that the trace is presumed to have taken. The presumed path may be obtained using data from path datastore 120.

A failed trace may return information that indicates which components along the path successfully forwarded the trace. For example, a trace might begin at the first endpoint 100 and proceed to network component 106, and then on to network component 108. However, the trace might then fail. Subsequent to initiating the failed trace, the first endpoint 100 might receive information listing network components 106 and 108 and indicating that they successfully received and retransmitted the trace. In some instances, a record of these components' successful participation in the trace may be recorded in attribution datastore 118. Attribution regarding the failure of the trace may be attributed to components on a presumed path to endpoint 102. In some instances, these components might be before the point of observed failure. In other instances, components after the point of observed failure might be blamed. For example, based on a previous successful trace, a measure of the fault might be attributed to the network components along the observed trace path 104, after network component 108. In some cases, a weighting function may be applied, so that some of the network components receive greater attribution for fault than others.

An analysis module 122 may utilize the success and failure information maintained in attribution datastore 118 to form an initial assessment of a component that is in a failure state. The analysis module 122 may, for example, form a sum of faults attributed to a particular component and then normalize the sum with respect to additional observed faults on other components. The forming may comprise calculating the sum and storing a result in memory. The analysis module 122 may then use the normalized value as an initial value in a statistical analysis that may identify a likely source of the fault.

Figure 2:
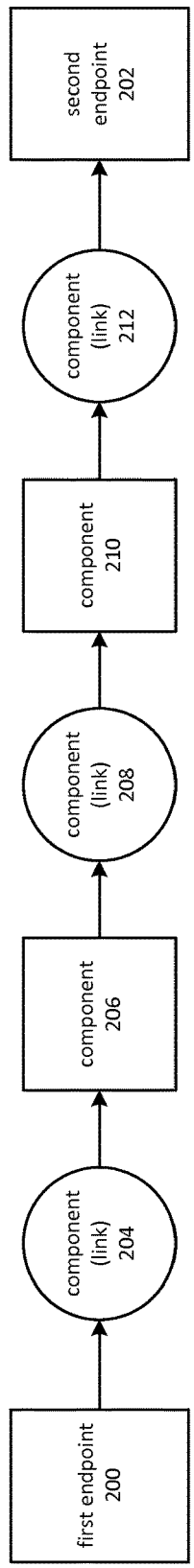
FIG. 2 is a block diagram depicting a network trace from a first endpoint to a second endpoint.

FIG. 2 is a block diagram depicting a network trace from a first endpoint to a second endpoint. A network trace may comprise executable instructions, such as a "traceroute" command, executed on the first endpoint with command parameters that specify the second endpoint as a destination. In some embodiments, the first endpoint 200 may transmit one or more packets to successfully more distant destinations along a path to the destination second endpoint 202. For example, the first endpoint 200 might transmit a packet that is intentionally expired after reaching component 206. A second packet might reach component 210, and a third might reach the second endpoint 202. In response to transmitting the packets, the first endpoint 200 may receive information that identifies the recipients of the packets, e.g., component 206 and component 210. Note that the network trace may not be able to directly observe some components on the network, such as the depicted link components 204, 208, and 212.

In various instances, a network trace may be also be conducted through other means, such as each of components 206 and 210 successively forwarding one or more packets sent from the first endpoint 200 and returning, to first endpoint 200, information about that stage of the link. In some cases, active monitoring of network components may also be employed to collect information for the network trace.

A data analysis module or other component operating on the first endpoint 200 may collect the information returned from the network trace and store it. Among the information stored may be a record of the path taken between the first endpoint 200 and the second endpoint 202. The information may also include a record storing an attribution of the successful trace to each of the involved components.

Figure 3:
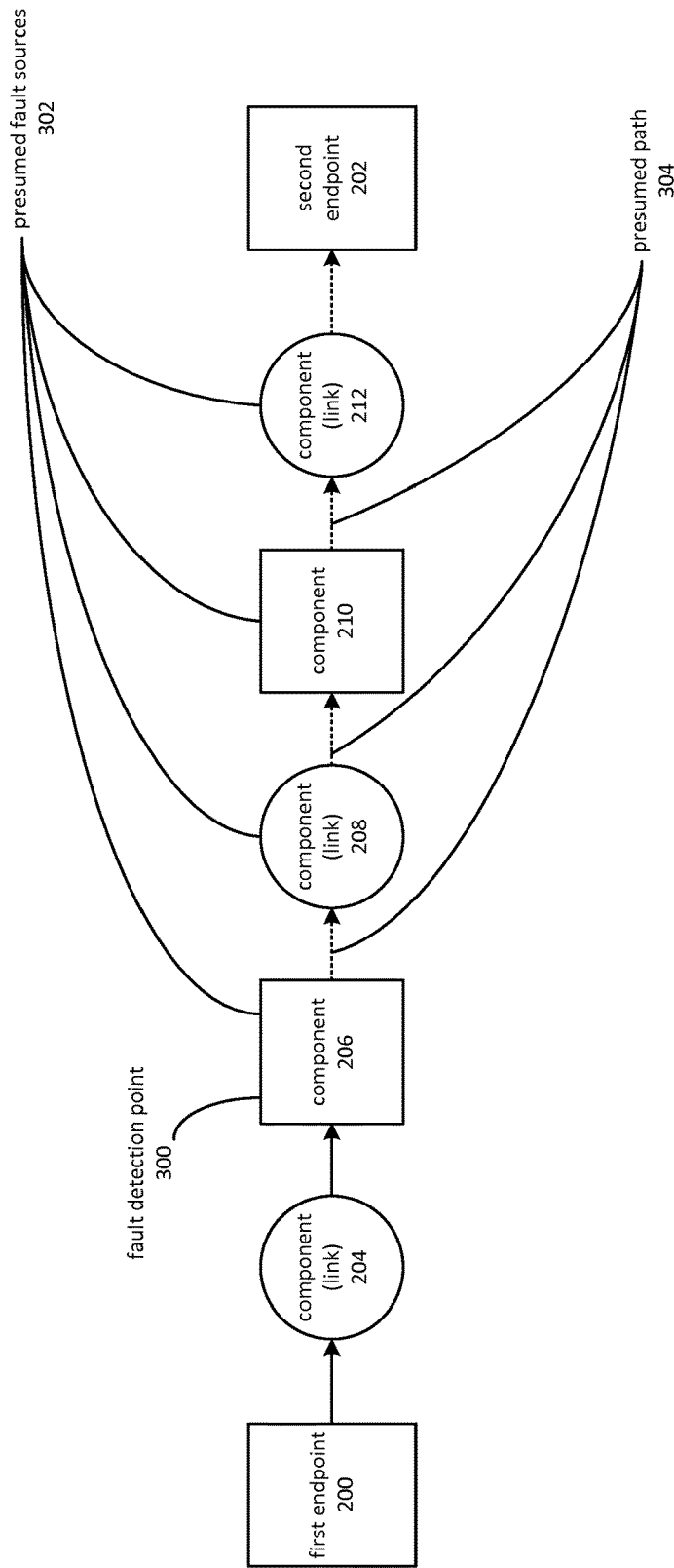
FIG. 3 is a block diagram depicting a faulty network from a first endpoint to a second endpoint.

FIG. 3 is a block diagram depicting a failed network from a first endpoint to a second endpoint. As was also illustrated in FIG. 2, the first endpoint 200 may attempt to perform a network trace between itself and the second endpoint 202. In some cases, however, the network trace might fail at some point along a path—not necessarily the same path taken on previous attempts—between the first endpoint 200 and the second endpoint 202.

A fault, which may also be referred to as a failure, may typically be manifested by a failure to reach one or more components along a path to the second endpoint 202. This might occur, for example, when there is an unsuccessful attempt to transmit a packet to a component along the path. The fault may be detected by a component 206 that was the last component that was successfully traversed. This component may be designated as a failure detection point 300. Here, traversed means that the component 206 received a packet of the network trace and attempted to forward it to a component that follows it, such as component 210. Note that various components, such as the link component 208, might be placed between a component 206 and another component that follows it, such as component 210.

The components 204-212 may be associated with a presumed path 304. The presumed path 304 may comprise those components that are associated with path information received and stored during a previously successful trace operation. Components along the presumed path 304 may be presumed fault sources 302. The components 206-212 may therefore be attributed with causing the fault. The degree to which each component is attributed to be a cause of the fault may depend on various factors, including distance from the fault detection point 300. An attribution function may allocate faults according to various distribution patterns. In some instances, components prior to the fault detection point 300 may be attributed with some portion of responsibility for a fault. This could, for example, occur when a component is causing subsequent components along the presumed path 304 to become overloaded.

FIG. 4 is a diagram depicting an example of a record in which attributions of successful and unsuccessful network traces may be stored. The arrangement depicted in FIG. 4 is intended to be illustrative of a record in which attributions should be stored. However, the particular format that is depicted in FIG. 4 should not be construed as limiting potential embodiments to only the depicted format. A variety of storage techniques and storage mechanisms may be employed to record attributions of successful and failed network traces with components of a network.

An attribution record 424 may be structured to map from various components of a network to values that are indicative of successes or failures allocated to a respective component. For example, the attribution record 424 may be structured as a table in which the rows each represent one or more network components, one column 400 represents values indicative of the component being attributed to a successful network trace, and another column 402 contains values indicative of the components being attributed to a failed network trace. In some instances, more than one network component may be associated with each row. This might be the case where network components, such as links and interconnects, are not detected by a network trace. However, these types of components might also be represented by a separate row in attribution record 424. They also might also be excluded from analysis, altogether or in the initial assessment phase.

When a success or failure is attributed to a component, a value associated with the component may be incremented by some amount. In some instances, each success or failure attributed to a component might result in an associated value being incremented by some fixed amount, such as by one. The values might also be distributed among the components to which the success or failure may be attributed from a sum of values.

FIG. 4 depicts one example of attributing successes and failures to components. For descriptive purposes, assume that 100 network traces have succeeded and 30 traces have failed. For each successful trace, each component known to have participated in the success might be attributed an equal portion of the successes. Components 404, 406, 408, and 410 could therefore each be associated with the value 100.

In the faults column 402, faults may be attributed to those network components that are on a presumed path to the second endpoint and that follow the last known properly functioning network component on the path. In FIG. 4, for example, a first endpoint performing a network trace might have received information indicating that component 404 operated correctly during the trace, whereas at least one component that followed component 404 in the trace malfunctioned. For example, the fault might be first detected at component 406. The component that malfunctioned might then be presumed to be one of components 406, 408, and 410 based in part on a previous observation of a successful network trace, or on other path information. Accordingly, the network faults might be attributed to components 406, 408, and 410. In this example, there were 30 faults, which might be attributed equally between components 406, 408, and 410. In various instances, the set of components to which faults are attributed may be made selectively, so that those components estimated to be at least somewhat likely contributors to a fault are included, while those estimated to be unlikely contributors to a fault are not. Accordingly, FIG. 4 shows components 406, 408, and 410 each being associated with the value 10. In some instances, attributions may be performed using a weighting function.

Figure 5:
FIG. 5 is a diagram depicting an example of a record of attributions for successful and unsuccessful network traces assigned using a weighting function.

FIG. 5 is a diagram depicting an example of a record of attributions for successful and unsuccessful network traces assigned using a weighting function. As with the example of FIG. 4, assume for descriptive purposes that 100 network traces have succeeded and 30 traces have failed. For each successful trace, each component known to have participated in the success might be attributed an equal portion of the successes. Accordingly, as with FIG. 4, each of the four components may be attributed the value 100, as may be seen in the corresponding entries in the successes column 500. It will be appreciated that the row-and-column format of FIG. 5 is intended to be illustrative of attributing network trace successes and failures to network components. Various storage techniques and data structures may be employed to record the attributions in addition to the row-and-column format of the attribution record 524 that FIG. 5 depicts.

Embodiments may attribute faults to the components 506, 508, and 510 using a weighting function. Component 504 may, in some cases, be attributed to no portion of the faults based on the assumption, for the purposes of this example, that it correctly handled its stage of the network trace and was more than some threshold distance away from the fault detection point.

In the example of FIG. 5, a weighting function has weighted attributions based on distance from a point at which a fault was detected. The component 506 where the fault was detected is attributed a portion of responsibility that is less than the subsequent component 508. The component 510 after that is also attributed to a smaller portion of responsibility, based on its distance from where the fault was detected.

A variety of weighting functions may be employed. Embodiments may select a weighting function based on reducing potential local minima or local maxima problems that may result when the values are used as a priori values in a statistical calculation. In one non-limiting example of a weighting function, the weighting function may attribute a declining proportion of responsibility for a failure to components along a path, starting with components that were not observed during the trace as correctly receiving and transmitting packets.

In some instance, attributions of successful network traces may be used as input to the weighting function. For example, a weighting function may attribute fewer faults to a network component that has a large number of successful network traces attributed to it.

Figure 6:
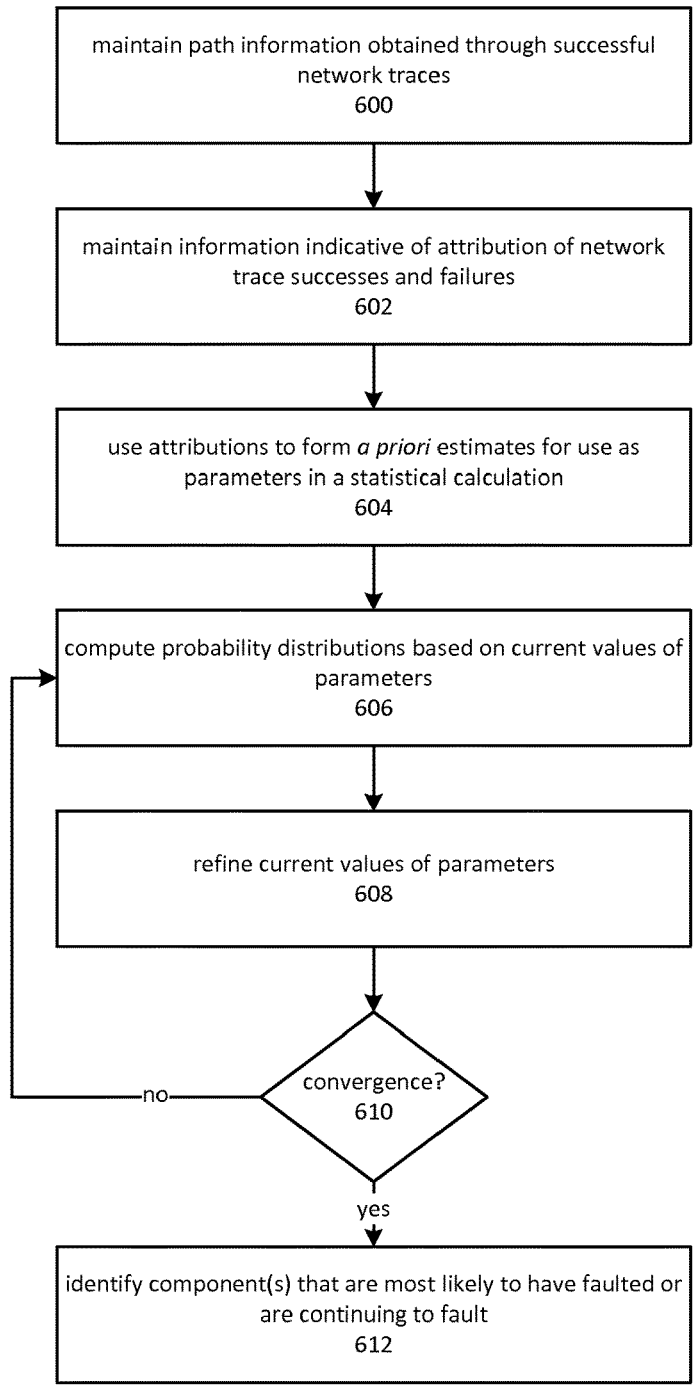
FIG. 6 is a flow diagram depicting a statistical calculation that uses a priori estimates of network fault locations.

FIG. 6 is a flow diagram depicting a statistical calculation that uses a priori estimates of network failure locations. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

Block 600 depicts an embodiment maintaining path information obtained through successful network traces. For example, an analysis module operating on a computing node in association with an endpoint of a network trace (such as the originator of the trace) may cause records of the paths taken on successful traces to be recorded. A network trace may be initiated on a periodic basis, such as once every five minutes, to cause the path information to be stored. The network trace might also be initiated on a dynamic basis, such as in response to a triggering condition, or be manually initiated. The data may be stored in a database management system. Embodiments may maintain the data with an index or other mechanism that allows for path information to be retrieved on the basis of one or more network addresses. For example, the database may be structured to process queries that comprise one or more network addresses representing a partial path to a destination endpoint. Upon being processed, the query may return one or more possible paths to the destination endpoint. The paths may be consistent with the set of network addresses that were supplied as input. This may involve the network addresses supplied as input matching the path returned as output.

Sources of information in addition to or instead of network traces may also be used. The information might comprise, for example, information about the topology of the network, information from active monitoring of various network components, and so forth.

Block 602 depicts an embodiment maintaining information indicative of attributions of network trace successes and failures. This may, for example, comprise maintaining records such as those depicted in FIGS. 4 and 5, or their equivalent in a non-table structure such as a list, graph, or tree.

Block 604 depicts an embodiment using the stored records of attributions to form a priori values for use as initial parameters in an iterative statistical calculation. The statistical calculation may, for example, comprise an expectation maximization calculation. The calculation may relate to a statistical model in which a combination of observed and unobserved variables affects a probability distribution governed by one or more of the parameters. The recorded attributions of network trace successes and failures may be used to form an initial estimate of the likelihood that a given network component is the cause of a network failure. The initial estimates may be used as parameters in the statistical calculation and then refined through an iterative process.

Block 606 depicts an embodiment computing a value indicative of a likelihood that a component is contributing to a fault condition based on the current values of the parameters. The value may relate to the relative likelihood of a network component being responsible for a network failure. At block 608, the values may be refined until convergence is detected at block 610. If convergence is detected, the current value may be used to identify a component that is likely to have failed. Aspects of the present disclosure may involve forming the initial estimates in a manner that avoids local minima/maxima issues that may result in improper convergence, a phenomenon that is more likely when parameters are initialized using an even distribution of values, or are initialized to random values.

Block 612 depicts the embodiment identifying a component or sets of components deemed most likely to have failed or to be continuing to fail, based on the statistical calculation. This may, for example, comprise the component having the highest number or highest percentage of errors attributed to it. It might also comprise selecting a network component having the highest estimated probability of being responsible for a network failure. Embodiments may take various actions based on identifying the component, such as triggering an alarm, initiating a diagnostic procedure, scheduling repair, and so forth.

Figure 7:
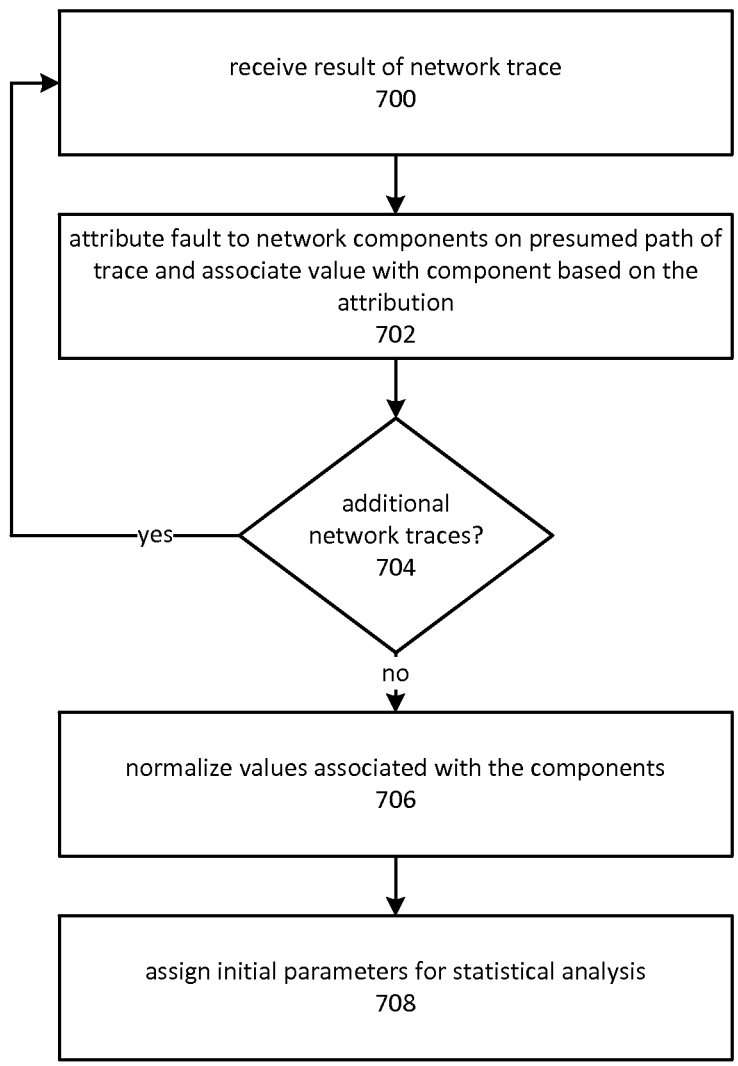
FIG. 7 is a flow diagram depicting aspects of initializing forming a priori estimates of network fault locations for use in a statistical analysis.

FIG. 7 is a flow diagram depicting aspects of initializing forming a priori estimates of network failure locations for use in a statistical analysis. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

Block 700 depicts an analysis module receiving the result of a network trace. As described herein, the analysis module may attribute faults to network components that are on a presumed path between the endpoints. The faults may be attributed to components based on factors that include, but are not limited to, distance from the failure detection point, successful participation in the current or previous traces, and application of a weighting function. These steps are depicted by block 702.

Block 704 depicts the analysis module determining if additional network traces are to be examined. Blocks 700 and 702 may be repeated for each of a plurality of network traces. Each pass of the operations depicted by blocks 702-704 may attribute faults locally, or in other words along the presumed path of each failed network trace.

Block 706 depicts the analysis module normalizing the values corresponding to the attributed successes and failures. This may be considered as a global operation, in that it incorporates failures attributed to network components in response to multiple failed network traces. Normalization may involve summing faults attributed, across the multiple failed network traces, to a given network component, and then dividing the sum by a total number of faults. In some instances, the normalized value may represent a ratio of the individual network component's attributed faults, across all network traces, to a total of network faults or a total number of packets transmitted.

At block 708, the analysis module may use the normalized values as the initial parameters in a statistical calculation. For example, the normalized values may represent initial probability estimates in an expectation maximization calculation that iteratively refines the initial estimates until convergence is reached. The initial probability estimates may improve the operation of the expectation maximization calculation by reducing the occurrence of local minima and local maxima problems.

Figure 8:
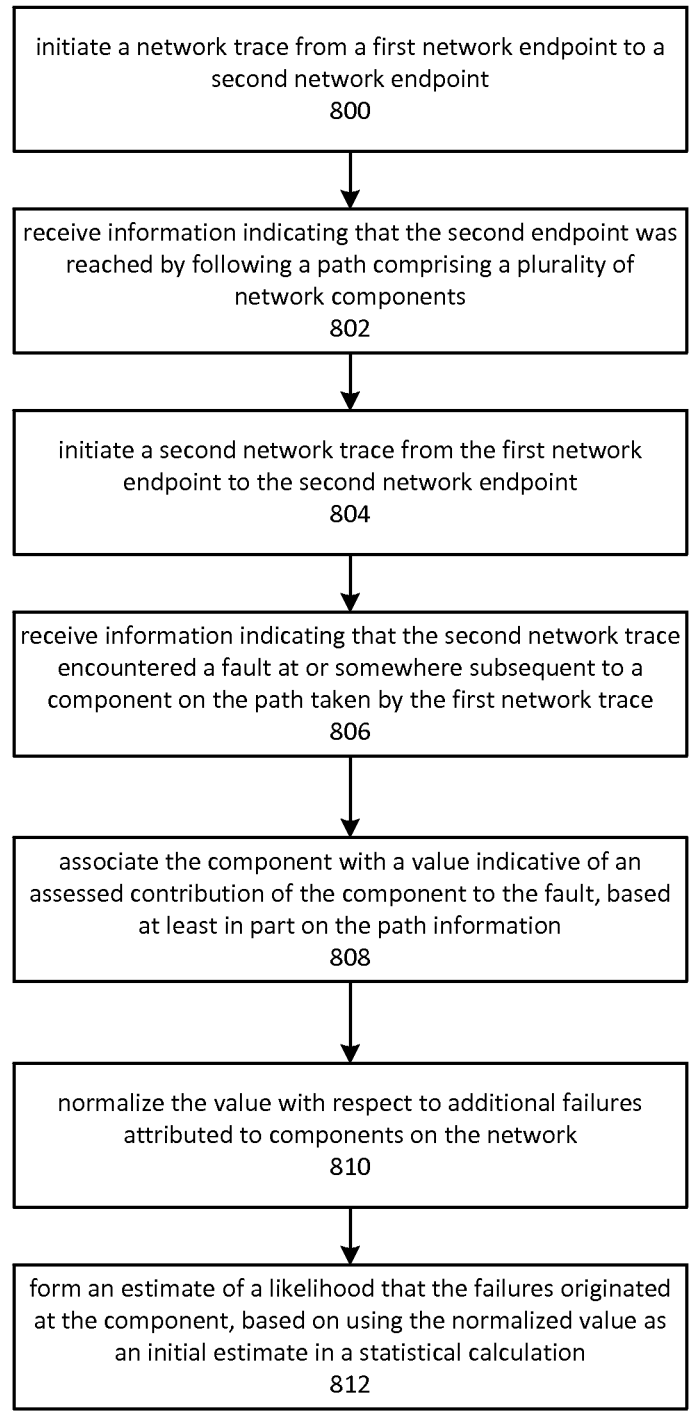
FIG. 8 is a flow diagram depicting estimation of network fault location using an initial probability assessment refined by a statistical calculation.

FIG. 8 is a flow diagram depicting estimation of network fault location using an initial probability assessment refined by a statistical calculation. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

Block 800 depicts an embodiment initiating a network trace from a first endpoint to a second endpoint. For example, an analysis module may direct the first endpoint to transmit a trace message from the first endpoint. The message may be directed to the second endpoint, but transmitted via some number of intervening network components.

At block 802, the embodiment may receive information indicating that the second network endpoint was successfully reached. This may involve the network trace successively reaching, via a succession of packets sent from the first endpoint, each network component on the path. From each network component reached during the trace, the first endpoint may receive information such as the network address that was reached and the network address of the next network component in the path, which the first endpoint may then attempt to reach. From this information, the embodiment may identify a path that may typically be taken from the first endpoint to the second endpoint. Note that a successful trace—one that successfully reaches the second endpoint—may encounter various errors, such as an unreachable network component that is bypassed by using an alternative path. Embodiments may treat the error information associated with an otherwise successful trace as it would other failures in an unsuccessful trace.

At block 804, the embodiment may initiate a second network trace from the first endpoint to the second endpoint. As indicated by block 806, a result of the second network trace may be that it is unable to reach the second network endpoint due to a fault by a component along a path that may be presumed to be the same path taken by the first network trace. This presumption is not necessarily true, since various conditions may cause network traffic to take different routes at different times.

At block 808, the embodiment may form a value that is indicative of an assessed contribution of the component to the fault. This may involve attributing some portion of responsibility for the fault to the component. The value may then be associated with the component. In some instances, the embodiment may also maintain a value that corresponds to attributions of successful network traces, or in other words a value that is indicative of an assessed contribution of the component to a successful network trace.

At block 810, the values may be normalized with respect to additional faults attributed to components on the network. An embodiment may, for example, form a sum of faults attributed to a particular component, which could then be divided by another sum of a total number of faults attributed to all components. The forming may include calculating the sum and storing the result in memory, and then performing the division to calculate a ratio. This ratio may be indicative of the proportion of total faults attributed to the particular component, and also of the likelihood that the particular component is responsible for observed network failures. The normalized value may also, in some instances, be calculated using attributions of successful network traces.

The normalized value formed in block 810 may be used in block 812 to form an estimate of the likelihood that a failure originated at the component, based on using the normalized value as an initial estimate in a statistical calculation, such as an expectation maximization calculation.

In some instances, embodiments may perform additional operations after forming the estimate of which component is most likely to be the cause of a network failure. These operations may involve transmitting information that indicates the identity of the network component that is the most likely cause of the failure.

Various aspects of the present disclosure may be practiced in conjunction with computing nodes operating in a distributed computing environment. The computing nodes may be interconnected by components of a network. Instructions for performing an initial estimation of a fault location and a refinement of the estimation using a statistical calculation may be performed on computing nodes in the distributed computing environment. The computing nodes may also serve as endpoints for initiating and receiving network traces.

Figure 9:
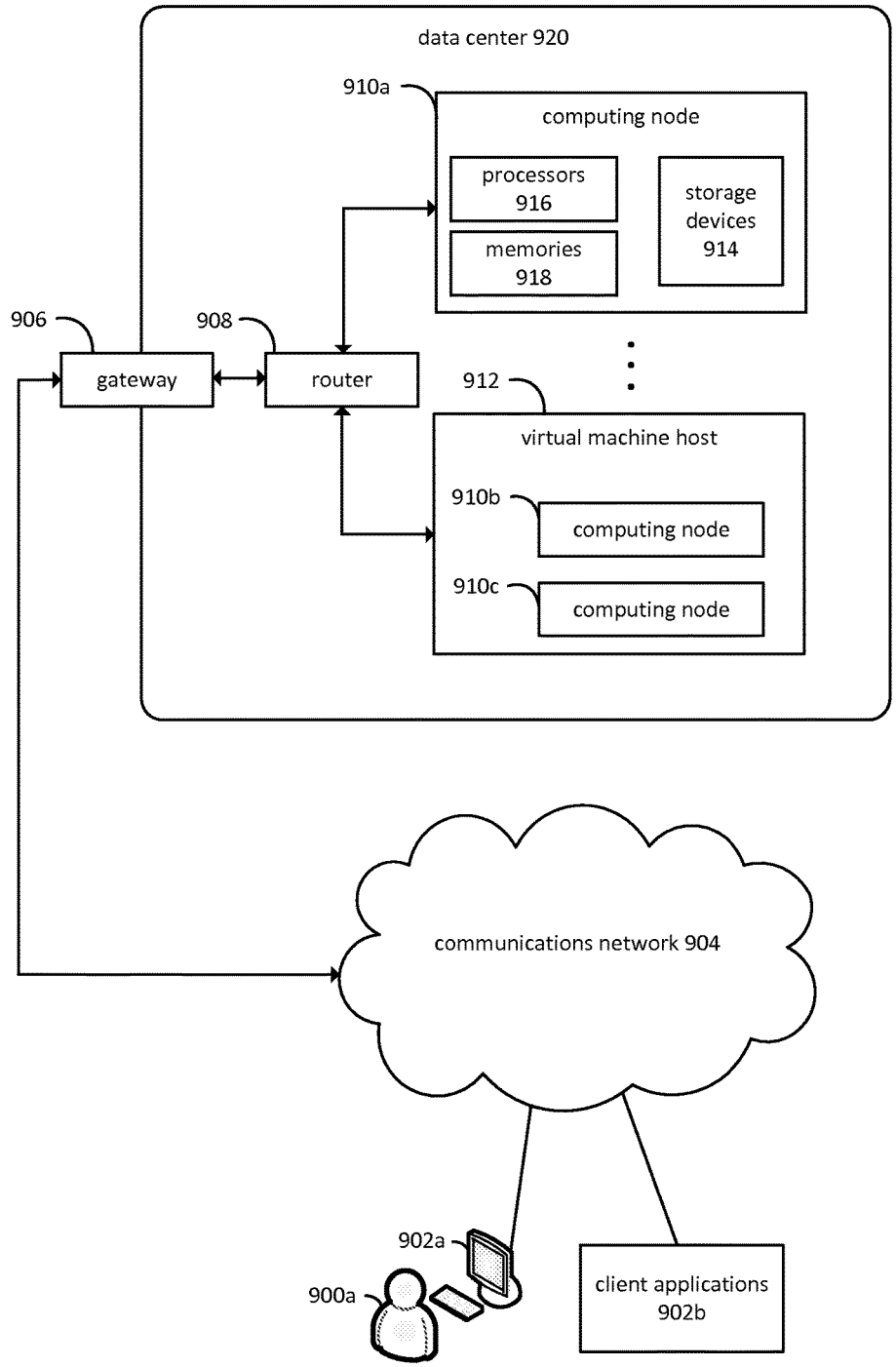
FIG. 9 is a block diagram depicting an embodiment of a computing environment in which aspects of the present disclosure may be practiced.

FIG. 9 is a diagram depicting an example of a distributed computing environment on which aspects of the present invention may be practiced. Various users 900a may interact with various client applications, operating on any type of computing device 902a, to communicate over communications network 904 with processes executing on various computing nodes 910a, 910b, and 910c within a data center 920. Alternatively, client applications 902b may communicate without user intervention. Communications network 904 may comprise any combination of communications technology, including the Internet, wired and wireless local area networks, fiber optic networks, satellite communications, and so forth. Any number of networking protocols may be employed.

Communication with processes executing on the computing nodes 910a, 910b, and 910c, operating within data center 920, may be provided via gateway 906 and router 908. Numerous other network configurations may also be employed. Although not explicitly depicted in FIG. 9, various authentication mechanisms, web service layers, business objects, or other intermediate layers may be provided to mediate communication with the processes executing on computing nodes 910a, 910b, and 910c. Some of these intermediate layers may themselves comprise processes executing on one or more of the computing nodes. Computing nodes 910a, 910b, and 910c, and processes executing thereon, may also communicate with each other via router 908. Alternatively, separate communication paths may be employed. In some embodiments, data center 920 may be configured to communicate with additional data centers, such that the computing nodes and processes executing thereon may communicate with computing nodes and processes operating within other data centers.

Computing node 910a is depicted as residing on physical hardware comprising one or more processors 916, one or more memories 918, and one or more storage devices 914. Processes on computing node 910a may execute in conjunction with an operating system or alternatively may execute as a bare-metal process that directly interacts with physical resources, such as processors 916, memories 918, or storage devices 914.

Computing nodes 910b and 910c are depicted as operating on virtual machine host 912, which may provide shared access to various physical resources, such as physical processors, memory, and storage devices. Any number of virtualization mechanisms might be employed to host the computing nodes.

The various computing nodes depicted in FIG. 9 may be configured to host services such as web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 10:
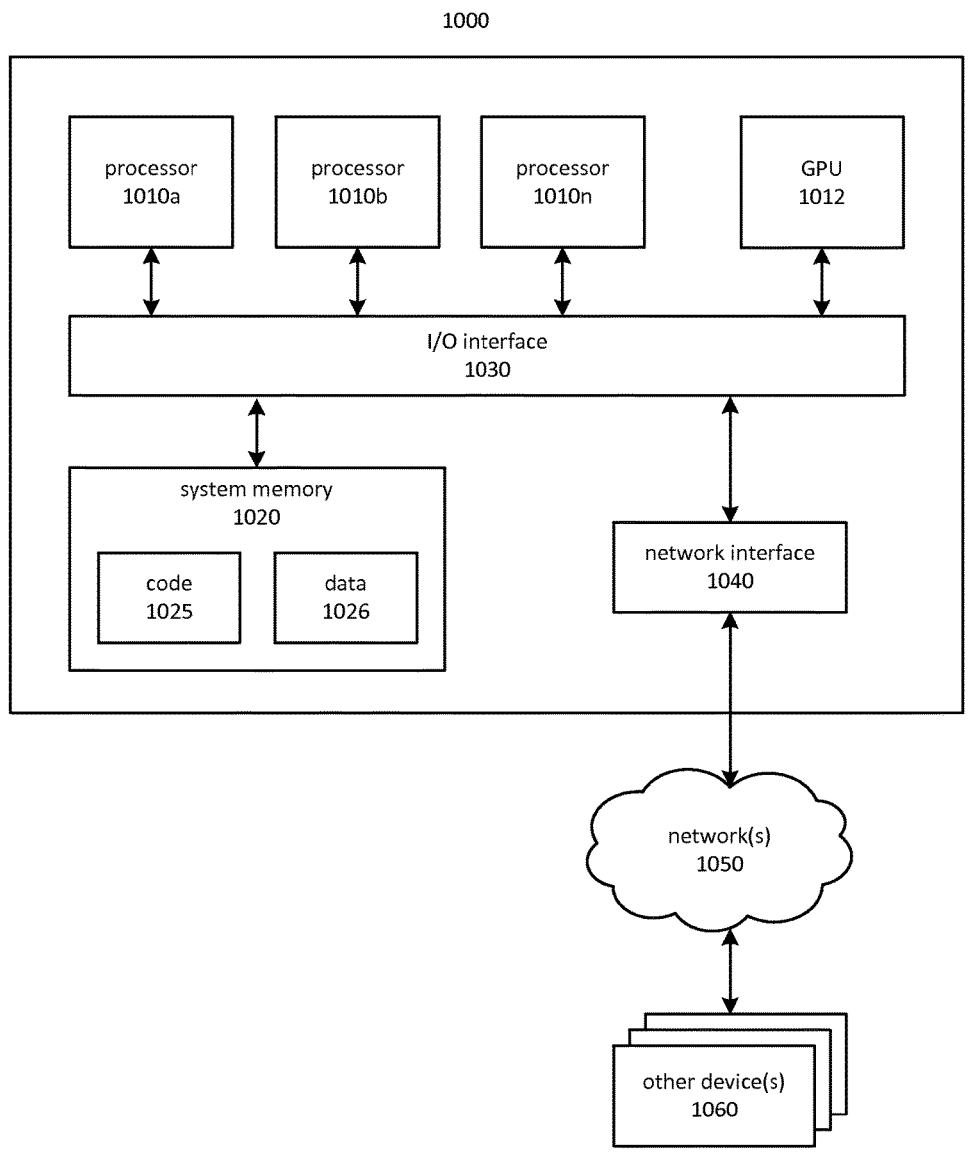
FIG. 10 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 10 depicts a general-purpose computer system that includes or is configured to access one or more computer-accessible media. In the illustrated embodiment, computing device 1000 includes one or more processors 1010a, 1010b, and/or 1010n (which may be referred herein singularly as a processor 1010 or in the plural as the processors 1010) coupled to a system memory 1020 via an input/output ("I/O") interface 1030. Computing device 1000 further includes a network interface 1040 coupled to I/O interface 1030.

In various embodiments, computing device 1000 may be a uniprocessor system including one processor 1010 or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures ("ISAs"), such as the x86, PowerPC, SPARC or MIPS ISAs, or any other suitable ISA. In multiprocessor systems, each of processors 1010 may commonly, but not necessarily, implement the same ISA.

In some embodiments, a graphics processing unit ("GPU") 1012 may participate in providing parallel computing functions such as graphics rendering and/or physics processing capabilities. A GPU may, for example, comprise a highly parallelized processor architecture specialized for graphical computations. In some embodiments, processors 1010 and GPU 1012 may be implemented as one or more of the same type of device. A GPU may, in some instances, be suited to performing statistical calculations, such as those described herein.

System memory 1020 may be configured to store instructions and data accessible by processor(s) 1010. In various embodiments, system memory 1020 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 1020 as code 1025 and data 1026.

In one embodiment, I/O interface 1030 may be configured to coordinate I/O traffic between processor 1010, system memory 1020, and any peripherals in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect ("PCI") bus standard or the Universal Serial Bus ("USB") standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computing device 1000 and other device or devices 1060 attached to a network or networks 1050, such as other computer systems or devices, for example. In various embodiments, network interface 1040 may support communication via any suitable wired or wireless general data networks, such as types of Ethernet networks, for example. Additionally, network interface 1040 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 1020 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 1000 via I/O interface 1030. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 1000 as system memory 1020 or another type of memory. Further, a computer-accessible medium may include transmission media or signals, such as electrical, electromagnetic or digital signals, conveyed via a communication medium, such as a network and/or a wireless link, such as those that may be implemented via network interface 1040. Portions or all of multiple computing devices, such as those illustrated in FIG. 10, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
    a first endpoint communicatively coupled to a second endpoint by one or more paths over a plurality of components of a network; and
    one or more memories having stored thereon computer-readable instructions that, upon execution by a computing device, cause the system at least to:
    receive, based on a first trace, information indicating that the second endpoint is reachable by a first path comprising a first component of the plurality of components, followed by a second component of the plurality of components;
    initiate a second trace by sending one or more packets from the first endpoint to the second endpoint;
    determine, based on data indicating a failure of at least one of the one or more packets to reach the second endpoint, a fault associated with the second trace, the fault at or following the first component;

store a first value indicative of an assessed proportion of contribution, relative to the second component, of the first component to the fault;

store a version of the first value normalized with respect to additional faults attributed to the plurality of components;

form a second value indicative of a likelihood that the fault originated at the first component based at least in part on the normalized first value used as an initial value in a statistical calculation;

receive, in response to one or more of the first trace or the second trace, information indicative of a plurality of packets that were successfully transmitted; and form an additional value indicative of contribution by the first component to success of one or more of the first trace or the second trace by evenly assigning to a plurality of components a count of the plurality of packets that were successfully transmitted by the plurality of components on one or more of the first path or a second path associated with the second trace.

2. The system of claim 1, further comprising one or more memories having stored thereon computer-readable instructions that, upon execution by the computing device, cause the system at least to:

receive, in response to the second trace, information indicative of a plurality of packets that were not successfully transmitted; and form the first value indicative of the assessed contribution by applying a weighting function to a count of the plurality of packets that were not successfully transmitted.

3. The system of claim 1, further comprising one or more memories having stored thereon computer-readable instructions that, upon execution by the computing device, cause the system at least to:

assess contribution of the second component to the fault based at least in part on the information indicating that the second endpoint was on the first path.

4. The system of claim 1, wherein the second value is based on the additional value indicative of contribution by the first component to success of one or more of the first trace or the second trace.

5. A method of identifying a failed network component, the method comprising:

maintaining information indicative of one or more paths between a first endpoint and a second endpoint, the one or more paths formed by a plurality of components of a network, the one or more paths comprising a first path including at least a first component and a second component, wherein at least a portion of the information indicative of one or more paths is based on a first trace;

determining, based on data indicating a failure of one or more packets of a second trace to reach the second endpoint, a fault involving the first component;

associating with the first component a first value indicative of a first portion of responsibility, relative to other components between the first and second endpoints, for the fault attributed to the first component;

adjusting the first value based at least in part on additional faults attributed to the plurality of components;

receiving, in response to one or more of the first trace or the second trace, information indicative of a plurality of packets that were successfully transmitted;

forming an additional value indicative of contribution by the first component to success of one or more of the first trace or the second trace by evenly assigning to a number of components a count of the plurality of packets that were successfully transmitted by the number of components on one or more of the first path or a second path associated with the second trace; and forming a second value indicative of a likelihood that the fault involved the first component by at least using the adjusted first value as an initial value in a statistical calculation.

6. The method of claim 5, wherein the first value and an additional value associated with the second component on the first path are based at least in part on applying a weighting function to a value indicative of the fault.

7. The method of claim 5, wherein the statistical calculation comprises an expectation maximization and the initial value corresponds to a parameter of the expectation maximization.

8. The method of claim 5, further comprising:

forming the second value based at least in part on the additional value.

9. The method of claim 5, wherein adjusting the first value comprises determining a total number of faults attributed to the components of the first path or the second path.

10. The method of claim 5, further comprising:

attributing the first portion of responsibility for the fault to the first component based at least in part on the information indicative of the one or more paths.

11. The method of claim 5, further comprising:

transmitting information indicative of a fault of the first component based at least in part on the second value.

12. The method of claim 5, wherein the information indicative of one or more paths is obtained by transmitting a packet of the first trace from the first endpoint to the first component, from the first component to the second component, and from the second component to the second endpoint.

13. A non-transitory computer-readable storage medium having stored thereon instructions that, upon execution by one or more computing devices, cause the one or more computing devices at least to:

maintain information indicative of a first path between a first endpoint connected to a second endpoint by a plurality of components of a network, wherein the first path comprises a first component followed by a second component, wherein at least a portion of the information indicative of the first path is based on a first trace;

determining, based on data indicating a failure of one or more packets of a second trace to reach the second endpoint, a fault at or following the first component;

store an association between the first component and a first value indicative of a proportion of contribution by the first component to the fault;

form an adjusted version of the first value based at least in part on normalizing the first value in proportion to a total number of additional faults attributed to the plurality of components;

receive, in response to one or more of the first trace or a second trace, information indicative of a plurality of packets that were successfully transmitted;

form an additional value indicative of contribution by the first component to success of one or more of the first trace or the second trace by evenly assigning to a number of components a count of the plurality of packets that were successfully transmitted by the number of components on one or more of the first path or a second path associated with the second trace; and form an estimated second value indicative of a likelihood that the fault originated at the first component based at least in part on using the adjusted version of the first value as an initial value in a statistical calculation.

14. The non-transitory computer-readable storage medium of claim 13, wherein the first value is determined by a weighting function.

15. The non-transitory computer-readable storage medium of claim 13, wherein the first value is less than an additional value indicative of a second portion of responsibility attributed to the second component.

16. The non-transitory computer-readable storage medium of claim 13, wherein the statistical calculation comprises expectation maximization.

17. The non-transitory computer-readable storage medium of claim 13, comprising further instructions that, upon execution by the one or more computing devices, cause the one or more computing devices to at least:
  form a first probability distribution based at least in part on the adjusted version of the first value; and
  form a second probability distribution based at least in part on the first probability distribution and the statistical calculation.

18. The non-transitory computer-readable storage medium of claim 13, wherein normalizing the first value comprises determining a total number of faults attributed to the components of the first path.

19. The non-transitory computer-readable storage medium of claim 13, comprising further instructions that, upon execution by the one or more computing devices, cause the one or more computing devices to at least:
  receive, in response to the second trace, information indicative of a plurality of packets that were not successfully transmitted; and
  form the first value indicative of a first portion of responsibility by applying a weighting function to a count of the plurality of packets that were not successfully transmitted.

20. The non-transitory computer-readable storage medium of claim 13, wherein the information indicative of the first path is based at least in part on a packet transmitted from the first endpoint to the first component, from the first component to the second component, and from the second component to the second endpoint.

\* \* \* \* \*